US009858775B2

(12) United States Patent
Yin et al.

(10) Patent No.: US 9,858,775 B2
(45) Date of Patent: Jan. 2, 2018

(54) PROMPTING MOVEMENT OF A DEVICE TOWARDS A STRONGER SIGNAL

(71) Applicant: Empire Technology Development LLC, Wilmington, DE (US)

(72) Inventors: Xuefeng Yin, Shanghai (CN); Quan Zuo, Shanghai (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/907,401

(22) PCT Filed: Jul. 25, 2013

(86) PCT No.: PCT/CN2013/080127
§ 371 (c)(1),
(2) Date: Jan. 25, 2016

(87) PCT Pub. No.: WO2015/010303
PCT Pub. Date: Jan. 29, 2015

(65) Prior Publication Data
US 2016/0189495 A1    Jun. 30, 2016

(51) Int. Cl.
*G08B 6/00* (2006.01)
*H04B 7/06* (2006.01)
(Continued)

(52) U.S. Cl.
CPC ............ *G08B 6/00* (2013.01); *H04B 1/3833* (2013.01); *H04B 7/0608* (2013.01);
(Continued)

(58) Field of Classification Search
CPC ...... G08B 6/00; H04B 17/318; H04B 17/336; H04B 1/3833; H04B 7/0608;
(Continued)

(56) References Cited

U.S. PATENT DOCUMENTS 6,266,010 B1    7/2001  Ammar et al.
6,281,839 B1 *  8/2001  Nielsen .................... H01Q 1/18
                                                          342/372
(Continued)

FOREIGN PATENT DOCUMENTS

CN    103178912 A    6/2013
WO    2011054576 A1  5/2011

OTHER PUBLICATIONS

International Search Report for International Application No. PCT/CN2013/080127, dated May 6, 2014.
(Continued)

*Primary Examiner* — Andrew Wendell
*Assistant Examiner* — Maryam Soltanzadeh
(74) *Attorney, Agent, or Firm* — Brundidge & Stanger, P.C.

(57) ABSTRACT

In an example embodiment, a gyro system attached to or integrated in a wireless communication device may be configured to generate physical force to prompt movement towards a stronger signal that indicates a direction in which the wireless communication device should be positioned or moved to improve the wireless communication quality.

30 Claims, 6 Drawing Sheets

(51) Int. Cl.
  *H04B 7/08* (2006.01)
  *H04B 17/318* (2015.01)
  *H04B 17/336* (2015.01)
  *H04B 1/3827* (2015.01)
  *H04L 12/26* (2006.01)
  *H04W 24/08* (2009.01)

(52) U.S. Cl.
  CPC ......... *H04B 7/0814* (2013.01); *H04B 17/318* (2015.01); *H04B 17/336* (2015.01); *H04L 43/0823* (2013.01); *H04L 43/16* (2013.01); *H04W 24/08* (2013.01)

(58) Field of Classification Search
  CPC .. H04B 7/0814; H04W 24/08; H04L 43/0823; H04L 43/16
  See application file for complete search history.

(56) References Cited

U.S. PATENT DOCUMENTS

| | | | |
|---|---|---|---|
| 6,393,255 | B1 | 5/2002 | Lane |
| 8,005,063 | B2 | 8/2011 | Miki et al. |
| 9,219,307 | B2* | 12/2015 | Takahashi ................ G01S 3/38 |
| 2003/0125043 | A1* | 7/2003 | Silvester ................ H04W 4/02 455/456.1 |
| 2008/0287108 | A1* | 11/2008 | Tien ................ H04W 4/02 455/414.1 |
| 2012/0231743 | A1* | 9/2012 | Mayer ................ H04W 64/00 455/67.11 |
| 2013/0288600 | A1* | 10/2013 | Kuusilinna ........... H02J 7/0004 455/41.2 |
| 2015/0118964 | A1* | 4/2015 | Frankland ............ H04W 4/008 455/41.1 |

OTHER PUBLICATIONS

Leve, F., et al., "A Scalable Control Moment Gyro Design for Attitude Control of Micro-, Nano-, and Pico-Class Satellites," Advances in the Astronautical Sciences, vol. 128, pp. 235-246 (2007).

Werner, S., et al., "Adaptive multiple-antenna receiver for CDMA mobile reception," IEEE International Conference on Communications, vol. 2, pp. 1053-1057 (Jun. 7-11, 1998).

Yin, X., et al., "Tracking of Time-Variant Radio Propagation Paths Using Particle Filtering," IEEE International Conference on Communications, pp. 920-924 (May 19-23, 2008).

* cited by examiner

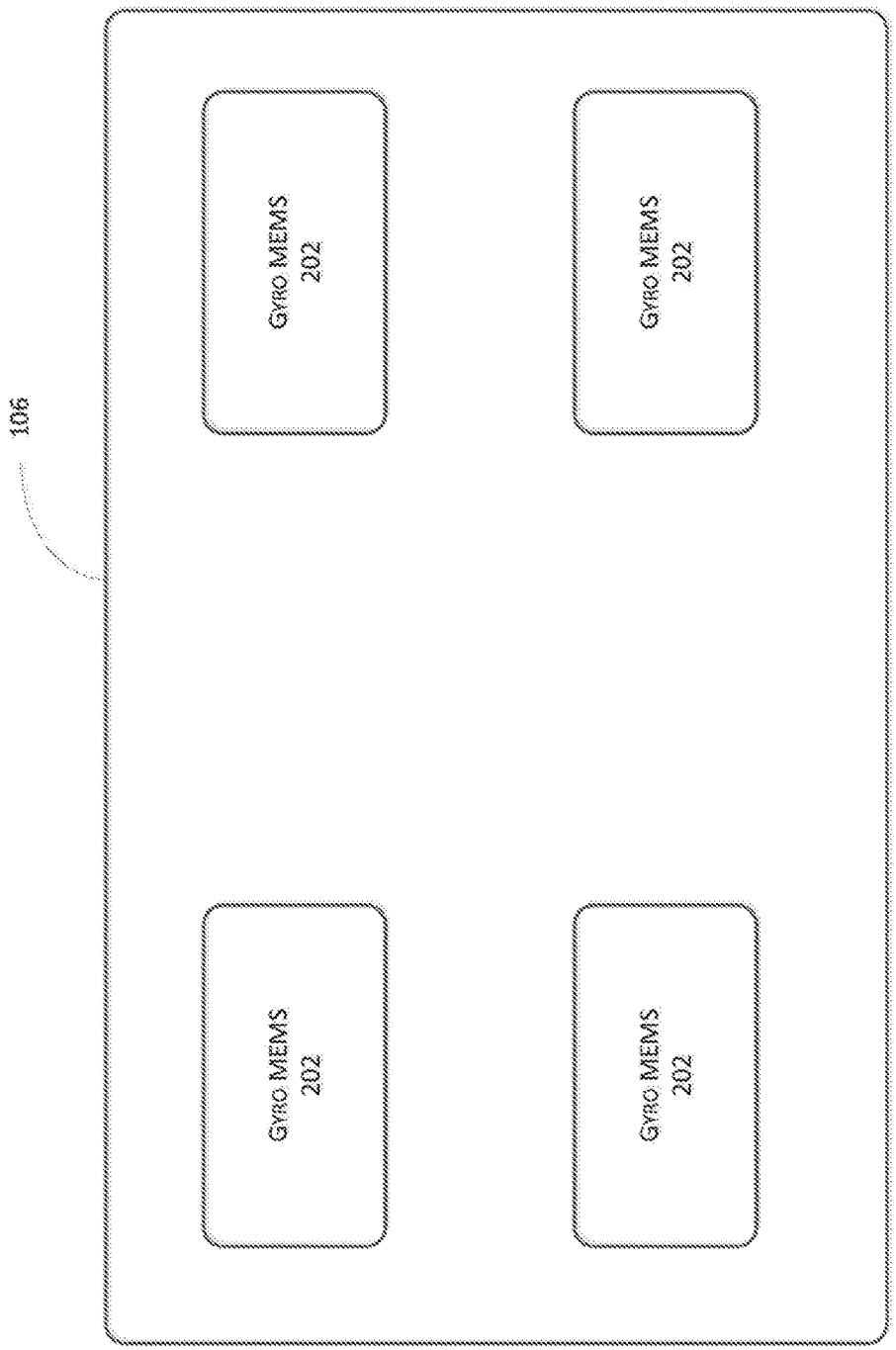

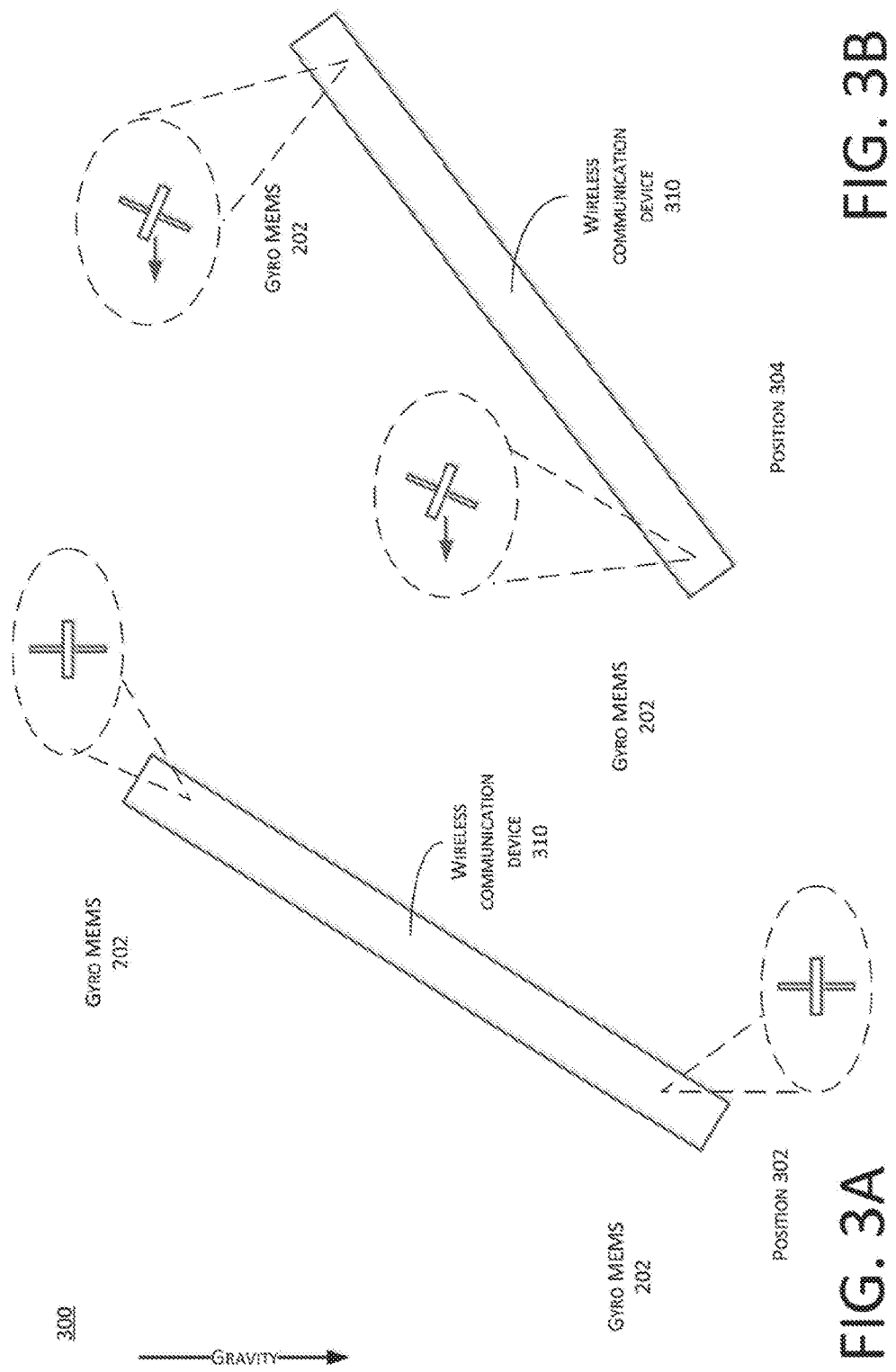

PROMPTING MOVEMENT OF A DEVICE TOWARDS A STRONGER SIGNAL

CROSS-REFERENCE TO RELATED APPLICATION

This Application is a U.S. National Stage filing under 35 U.S.C. §371 of International Application No. PCT/CN2013/080127, filed on Jul. 25, 2013. The International Application is hereby incorporated herein by reference in its entirety.

TECHNICAL FIELD

The technologies described herein pertain generally to prompting a user to move a communication device in a particular direction towards a stronger signal to improve channel quality for a wireless communication device.

BACKGROUND

Unless otherwise indicated herein, the approaches described in this section are not prior art to the claims in this application and are not admitted to be prior art by inclusion in this section.

For a wireless communication device with a single antenna, the quality of a communication channel may be at least partially determined by the physical orientation of the antenna in the wireless communication device, relative to a base station. Changing the physical orientation (e.g., posture or position) of the wireless communication device towards a prompted direction may improve the quality of the communication channel.

SUMMARY

Technologies are generally described for generating a prompt toward a stronger signal. The various techniques may be implemented in various devices, methods and/or systems.

In some examples, various techniques can be implemented as methods on a wireless communication device. Some methods may include determining that a first reading of channel quality for a wireless communication signal is below a predefined quality threshold, and generating a physical force in the wireless communication device to indicate a direction in which a second reading of channel quality for the wireless communication is likely to be stronger than the first reading of channel quality. Thus, the user may be prompted to move the communication device in the direction towards the stronger signal.

In some examples, various techniques can be implemented as a device such as a portable wireless communication device. Some example devices can include a processor configured to receive, at a first time, a parameter indicating wireless communication quality with respect to the portable device, determine that the wireless communication quality is below a predefined quality threshold based on the parameter, and generate an activation signal in response to the determining; and a gyro system, coupled to the processor, configured to generate a torque in a first direction to indicate a direction in which the portable device should be moved (e.g., turned, rotated, raised, lowered, twisted, or otherwise positioned) in response to the activation signal.

Some additional example devices may be implemented as a wireless communication device that may include one or more of a proximity sensor, an accelerometer, a gyro system and/or a processor. The proximity sensor can be configured to detect that the wireless communication device is held by a user, and to generate a proximity signal indicating the detecting. The accelerometer can be configured to generate an accelerometer signal to indicate a three-dimensional (3D) posture of the wireless communication device; a gyro system configured to generate a torque in a first direction in response to receiving an activation signal; a processor coupled to the proximity sensor, the accelerometer, and the gyro system, the processor configured to receive a parameter indicating wireless communication quality with respect to the wireless communication device, to determine that the wireless communication quality is below a predefined quality threshold based on the parameter, and to generate the activation signal based on the accelerometer signal and in response to determining that the wireless communication quality is below the predefined quality threshold and receiving the proximity signal from the proximity sensor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings:

FIG. 2 shows an example gyro system by which one or more embodiments of prompting movement of a device towards a stronger signal may be implemented;

FIG. 3A and FIG. 3B show example side views of an example wireless communication device on which one or more embodiments of prompting movement of a device towards a stronger signal may be implemented;

Figure 1:
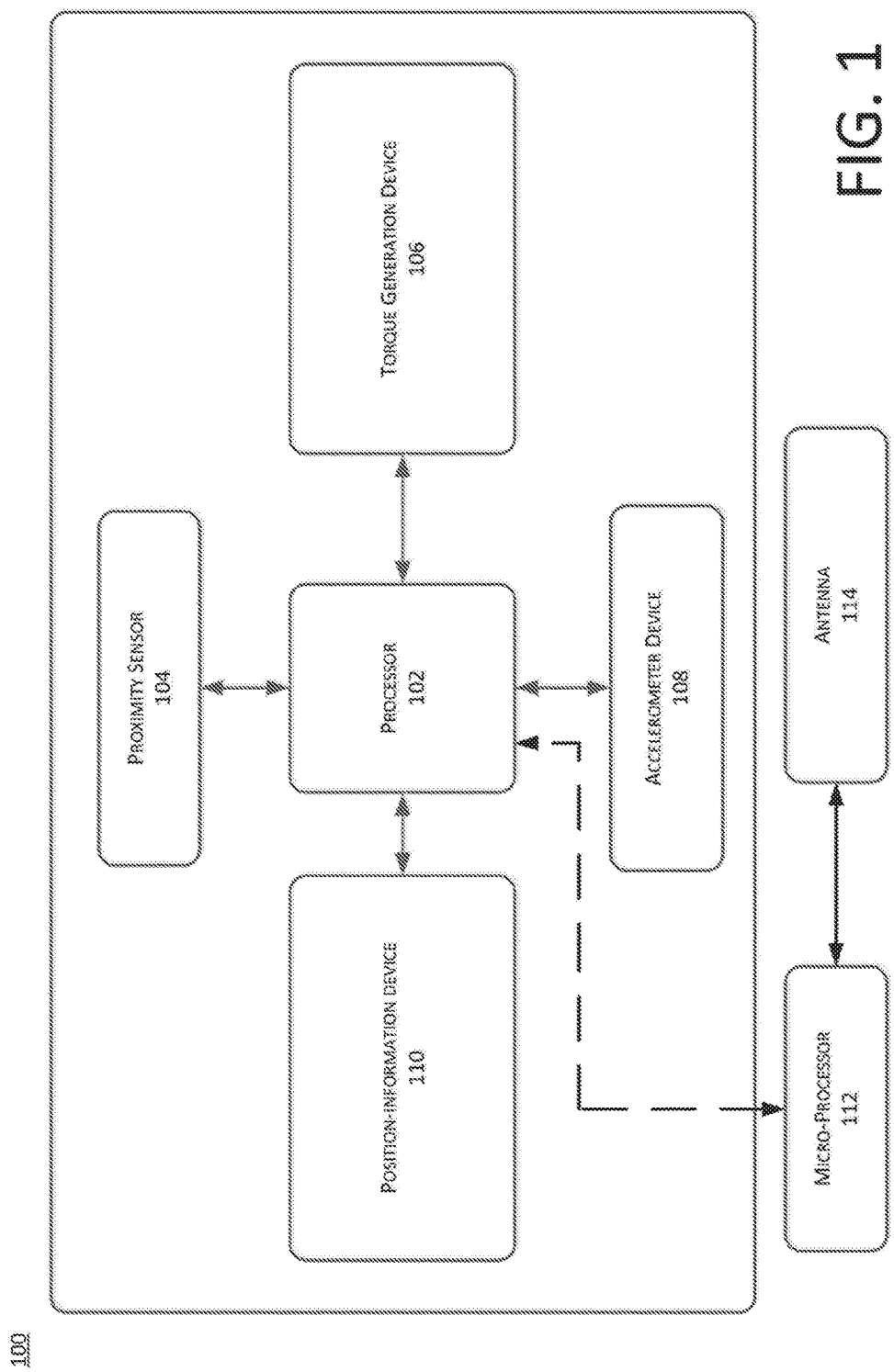
FIG. 1 shows an example device in which one or more embodiments of prompting movement of a device towards a stronger signal may be implemented.

All arranged in accordance with at least some embodiments described herein.

DETAILED DESCRIPTION

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example device 100 in which one or more embodiments of generating physical responses may be implemented, arranged in accordance with at least some embodiments described herein. As depicted, example device 100 includes, at least, a processor 102 communicatively coupled to a proximity sensor 104, a torque generation device 106, an accelerometer device 108, a position-information device 110, a micro-processor 112, and an antenna 114. Example device 100 may be integrated in or coupled to a wireless communication device. The wireless communication device may refer to a mobile (or portable) electronic device such as a mobile phone, smartphone, personal digital assistant (PDA) a personal media player device, an application specific device, or a hybrid device that may include any of the above functions. Alternatively, the wireless communication device may be implemented as a personal computer including tablet, laptop computer, non-laptop computer configure configurations, etc.

Processor 102 may refer to a micro-processor, microcontroller, or some other circuit or device that is configured to receive information that indicates a wireless communication quality with respect to the wireless communication device from a physical layer of the wireless communication device. Non-limiting examples of the received information that indicates a wireless communication quality may include one or more parameters such as a bit error rate (BER), received signal strength indicator (RSSI), or a signal-to-noise ratio (SNR). Further, non-limiting examples of the physical layer may include wireless channels, antennas, single antennas, and corresponding processing components. In accordance with at least one example embodiment, processor 102 may refer to a processor of the wireless communication device.

In a wireless communication, symbols are transmitted over a communication channel that may represent one or more of digital information and/or analog information. The transmitted information of each symbol may be used to represent one or more data bits of a data stream. A basic data stream of the transferred information may be represented in the form of data bits, each of which may be represented with a value of either 1 or 0. In some examples the symbol transmission rate may correspond to an integer number of data bits (e.g., 1 bit/symbol, 2 bits/symbol, 3 bits/symbol, etc.); while in other examples the symbol transmission rate may correspond to a non-integer number of data bits (e.g., 1.5 bits/symbol, 2.25 bits/symbol, 3.75 bits/symbol, etc.). The overall transmission rate of data bits can sometimes be referred to as an effective bit rate or effective bit transmission rate, often represented in terms of bits/seconds.

Bit errors may refer to a number of received bits in the data stream over the communication channel that have been altered due to various conditions such as noise, interference, distortion, or bit synchronization errors. Bit error rate, or BER, may refer to number of bit errors divided by a total number of transferred bits during a time interval of the communication. In a communication process, signal to noise ratio, or SNR, may refer to a ratio of the power level of a desired signal to the power level of the background noise. A high BER value may indicate a low quality of a wireless communication channel. A high SNR value may indicate a high quality of the wireless communication channel. The number of bit errors, the total number of transferred bits, the power level of the received signal, and/or the level of power of the background noise may be recorded and further processed by the physical layer of the wireless communication device. The value of BER and/or SNR may thus be generated by the physical layer. However, in some examples, the value of the BER and the SNR may be generated by a media access control layer.

In some examples, a wireless communication device such as mobile phone, processor 102 may be communicatively coupled to an antenna (e.g., antenna 114) of the mobile phone, which may be configured to collaboratively transmit and/or receive signals carrying information for the wireless communication. Micro-processor 112, together with antenna 114, may be configured to collaboratively record and/or process signal characteristics such as a total number of the transferred bits (e.g., the effective bits transferred) and/or a number of bit errors, which can be further utilized by micro-processor 112 to determine a value that indicates signal quality such as BER (e.g., based on the effective bit rate). In addition, micro-processor 112 and antenna 114 may be configured to collaboratively record and/or process one or more of a power level of a received signal and a power level of the background noise, and to further calculate the value of SNR of the wireless communication channel. The value of BER and/or SNR may then be transmitted to processor 102 as mentioned above.

Processor 102 may be further configured to determine whether current wireless communication channel quality for the wireless communication device is below a predefined quality threshold based on the received information. The quality threshold may be predefined to ensure the quality of wireless communication, and may be in the form of a predefined BER, predefined SNR, predefined RSSI, or some other quality metric. For example, the quality threshold may be predefined as a BER of 30%, a RSSI of 12, or a SNR of 10 dB indicating a minimum acceptable wireless communication quality. A reading of BER that is above 30% may be the basis of a determination that current wireless communication channel quality is not acceptable.

Processor 102 may be further configured to generate an activation signal in response to the result of the determination based on quality threshold. For example, the activation signal may be generated when the received information is determined to fall below the predefined quality threshold, which may indicate that the wireless communication quality has deteriorated to an unacceptable level. Further to the aforementioned example, processor 102 may be configured to generate the activation signal when the received BER is determined to be higher than the predefined threshold (e.g., 30% or the received SNR is lower than 10 dB). Alternatively, processor 102 may generate the activation signal when the RSSI is lower than a predefined threshold number (e.g., 12), which may be indicative of an unacceptable signal strength.

Proximity sensor 104 may refer to a sensor, coupled to processor 102, that is configured to generate a proximity signal when the wireless communication device is held, attached by a clip), or otherwise possessed (e.g., in a pocket or purse) by a user. In operation, proximity sensor 104 may be configured to initiate a signal that may result in feedback (e.g., a presence or an absence of a reflection resulting from the signal), which can be utilized to determine whether the wireless communication device is in close proximity to the user's body, (e.g., close to the user's head during the wireless communication). The feedback resulting from the sensed signal may be further processed with other information collected from the surrounding environment to generate the proximity signal that indicates whether the wireless communication device is held by a user. Such collected information may include a determination of whether a headphone is communicatively coupled to the wireless communication device, a determination of whether the wireless communication device is configured in a speaker mode, and/or a determination of whether the wireless communication device is held by an inanimate mount or docking device. Proximity sensor 104 may be further configured to selectively transmit the proximity signal to processor 102, which may be further configured to selectively generate a deactivation signal (e.g., the opposite or inverse of a corresponding activation signal) regardless of the aforementioned received information falling below the predefined quality threshold. That is, even when the communication quality is below the quality threshold, the physical force can be generated when the wireless communication device is detected to be held or otherwise possessed by the user, e.g., in the user's hand, in the user's pocket, etc.

Torque generation device 106, coupled to processor 102, may refer to a device, apparatus, or systems, including one or more gyro Micro Electromechanical Systems or MEMS. In operation, the torque generation device 106 can be configured to respond to the activation signal from processor 102 to selectively generate a torque or a vibration that indicates a direction in which the wireless communication device may be moved to improve the wireless communication quality over a given channel. The torque or vibration may be strong enough to be too physically discernible to a user who holds or otherwise possesses the wireless communication device, e.g., in the user's hand, in the user's pocket, etc. After the user detects the indicated direction, the user may move to adjust the posture or position of the wireless communication device according to the indicated direction of the torque or vibration to improve the wireless communication quality. The directional indication may be generated by processor 102 based on information collected and recorded at a prior time. For example, the processor may determine the direction to indicate by evaluation of the prior collected information about the channel quality when the wireless communication was in a particular position as indicated by accelerometer device 108 and/or position-information device 110.

Accelerometer device 108, coupled to processor 102, may refer to a sensor configured to generate an accelerometer signal indicating a three-dimensional (3D) posture of the wireless communication device. In operation, the accelerometer device 108 may be further configured to transmit the accelerometer signal to processor 102. Processor 102 may then selectively activate torque generation device 106 to indicate the direction to move the wireless communication device to achieve improved channel performance. Processor 102 may also be configured to record the accelerometer signal indicating the 3D posture of the wireless communication device as the initial posture thereof. Further torque and other forces (e.g., vibration) may be generated responsive to calculations performed by processor 102 based on the initial posture of the wireless communication device.

Position-information device 110, coupled to processor 102, may refer to one or more sensors configured to provide spatial information related to the wireless communication device over a time interval of the communication. Non-limiting examples of position-information device 110 may include a Global Position System (GPS) module and/or a gyroscope module. An example GPS module may be utilized to generate GPS positional information (e.g., latitude, longitude, altitude, Doppler, etc.), which can be monitored and/or recorded by the processor 102 over the time interval of the communication. An example gyroscope module may be configured to generate one or more signals to indicate the rotation and/or vertical movement of the wireless communication system. Position-information device 110 may be further configured to provide the spatial information to processor 102, which may be further configured to capture, record, and/or associate the spatial information with the wireless communication quality over the time interval of the communication. The spatial information can be thus utilized by the processor 102 to estimate a position or orientation of the device with stronger wireless communication channel quality than a current position of the wireless communication device and further indicate a direction in which the wireless communication device should be moved (e.g., turned, rotated, raised, lowered, twisted, or otherwise positioned) to improve the wireless communication channel quality. For example, during a given time interval of the communication, as the user holding the wireless communication device walks while conducting a phone call, position-information device 110 may be utilized to record the dynamic position information of the wireless communication device during the course of the phone call. When the user passes point A, processor 102 may receive information indicating that current wireless communication channel quality has a low BER or high SNR, below a predefined quality threshold. Accordingly, processor 102 may determine a direction to indicate a physical orientation of the wireless communication device that may improve wireless communication channel performance, where processor 102 may generate a signal utilized by torque generation device 106 to generate a torque or a vibration so that the directional indication may be perceived by the user.

Other examples of device 100 may include a processor and a torque generation device. The processor can be coupled to the torque generation device. The processor can be configured to receive, at a first time, a parameter to indicate wireless communication quality with respect to the wireless communication device, determine that the wireless communication quality is below a predefined quality threshold based on the received parameter, and generate an activation signal when the wireless communication quality is determined to be below a predefined quality threshold. The torque generation device can be configured to receive the activation signal from the processor, generate a torque in a first direction in response to the received activation signal. The torque generated by the torque generation device indicates an estimated direction in which the wireless communication device should be moved to improve wireless communication quality.

Examples of device 100 may further include a proximity sensor, an accelerometer, a torque generation device, and a processor. The proximity sensor can be configured to detect that the wireless communication device is held by a user, and generate a proximity signal to indicate that the wireless communication device has been detected to be held by the user. The accelerometer can be configured to generate an accelerometer signal to indicate a posture of the wireless communication device. The torque generation device can be configured to receive an activation signal and to generate a torque in a first direction in response to the activation signal. The processor can be coupled to the proximity sensor, the accelerometer, and the torque generation device. The processor can be configured to receive a parameter to indicate wireless communication quality with respect to the wireless communication device, to determine that the wireless communication quality is below a predefined quality threshold based on the parameter, and when the wireless communication quality is determined to be below the predefined quality threshold, to generate the activation signal based on the accelerometer signal and the proximity signal.

As described above, FIG. 1 shows an example device 100 in which one or more embodiments of generating physical responses may be implemented.

FIG. 2 shows an example torque generation device by which one or more embodiments of generating physical responses may be implemented in accordance with at least some embodiments described herein. As depicted, example torque generation device 106 may include one or more gyro micro-electro-mechanical systems (MEMS) 202.

Gyro MEMS 202 may be configured to generate sufficient torques or other forces to provide an indication of the direction in which the wireless communication device may be moved or positioned. Further, Gyro MEMS 202 may be packed during manufacture similarly to other integrated circuits and may be configured to provide either analog or digital types of signal output (e.g., voltage, current, data, etc.). Gyro MEMS 202 may include one or more mechanisms (e.g., lithographically constructed devices), that include components equivalent to spin axes and rotors. At least in some example embodiments, to indicate a direction in a three-dimension space, torque generation device 106 may include two or more gyro MEMS 202, each of which may be further affixed proximate to the wireless communication device. Each of gyro MEMS 202 may be configured to create an output torque to indicate a direction for the user to move the device. For example, the combination of output torques of the two or more gyro MEMS 202 may indicate one of the two directions to which the wireless communication device may be moved (e.g., turned, rotated, raised, lowered, twisted, or otherwise positioned).

Thus, FIG. 2 shows an example torque generation device 200 by which one or more embodiments of generating physical responses may be implemented.

FIG. 3A and FIG. 3B show example side views 300 of an example wireless communication device 310 on which one or more embodiments of generating physical responses may be implemented in accordance with at least some embodiments described herein. As depicted, side views 300 show gyro MEMS 202 integrated in or affixed to a wireless communication device 310 at a position 302 (FIG. 3A) and a position 304 (FIG. 3B) respectively. For illustrative purposes only, gyro MEMS 202 may be illustrated as spinning traditional gyros, each including a spin axis and a rotor.

FIG. 3A depicts wireless communication device 310, including gyro MEMS 202, at position 302, at which the wireless communication quality may be determined to be below the threshold. Position 302 may be identified by processor 102 by retrieving an accelerometer signal, from accelerometer device 108, which can indicate a 3D posture of the wireless communication device. The spin axis of each of gyro MEMS 202 may be substantially parallel to the direction of gravity relative to wireless communication device 310.

FIG. 3B depicts wireless communication device 310 tilted to position 304, at which the wireless communication quality may be improved. The spin axis of each of gyro MEMS 202 may be substantially parallel to each other, but an angle may exist between the spin axis and the gravity direction when gyro MEMS are tilted together with wireless communication device 310. Accordingly, an output force may be created in response to the effect of precession, to return the spin axes of the respective gyro MEMS 202 to substantially parallel relative to the direction of gravity. The output forces of the multiple gyro MEMS 202 may be combined by torque generation device 106 to generate a torque according to the force, where the torque can be utilized to indicate a direction in which wireless communication device 310 may be moved (e.g., turned, rotated, raised, lowered, twisted, or otherwise positioned) to improve the wireless communication channel performance.

Thus, FIG. 3A and FIG. 3B show example side views 300 of an example wireless communication device in which one or more embodiments of generating physical responses may be implemented.

Figure 4A:
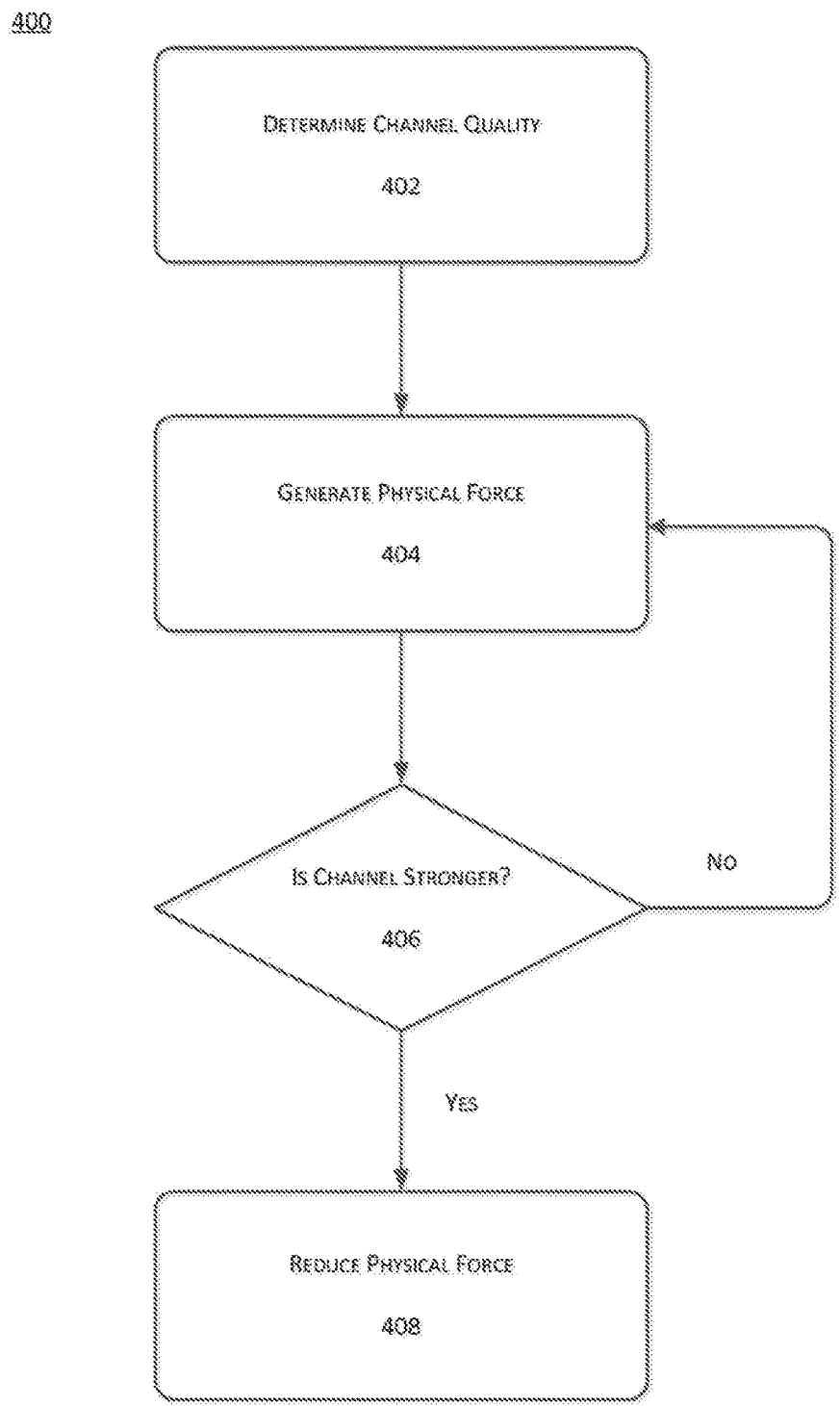
FIG. 4A shows an example configuration of a processing flow of operations by which embodiments of prompting movement of a device towards a stronger signal may be implemented.

FIG. 4A shows an example configuration of a processing flow 400 of operations by which embodiments of prompting movement of a device towards a stronger signal may be implemented, arranged in accordance with at least some embodiments described herein. As depicted, processing flow 400 may include sub-processes executed by various components that are part of example device 100. However, processing flow 400 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 400 may include various operation, functions, or actions as illustrated by one or more of blocks 402, 404, 406, and/or 408. Processing may begin at block 402.

Block 402 (Determine Channel Quality) may refer to processor 102 monitoring a channel to capture a first reading of channel quality for a wireless communication signal and further determining that the first reading of channel quality is below a predefined quality threshold. The reading of channel quality may include a BER value and/or a SNR value. As set forth above, BER may be a number of bit errors divided by a total number of transferred bits during a time interval of the communication. SNR may be defined as a ratio of the level of power of a desired signal to the level of power of background noise. In accordance with some examples, the values of BER and/or SNR may then be generated by the physical layer or the media access control layer of an uplink wireless communication of a wireless communication device. Non-limiting examples of the physical layer may include wireless channels, antennas, single antennas, and corresponding processing components. Processing may continue from block 402 to block 404.

Block 404 (Generate Physical Force) may refer to processor 102 determining that wireless communication device is held by a user and activating an electro-mechanical component (e.g., torque generation device 106) in wireless communication device to generate a physical force upon determining that the first reading of channel quality is below the predefined quality threshold. Processor 102 may be further configured to determine that wireless communication device is held by a user based on a proximity signal from proximity sensor 104 together with other information collected from the surrounding environment including whether a headphone is communicatively coupled to the wireless communication device, whether the wireless communication device is on speaker mode, and/or whether the wireless communication device is held by an inanimate mount.

Block 404 may further refer to torque generation device 106 generating a physical force to indicate a direction in which a second reading of channel quality for the wireless communication is stronger than the first reading. The second reading may indicate a possible improvement in channel quality or may meet the predefined quality threshold. The physical force may be a torque or a vibration that may be felt by human hands to indicate the direction in three-dimensional (3D) space. The direction may be calculated at least in part on a previous orientation of wireless communication device, information related to a condition of a wireless communication channel, or both. For example, spatial information recorded and provided by position-information device 110 (e.g., a GPS component and/or a gyroscope) may be associated by processor 102, with information indicating the wireless communication quality over a given time interval of the communication. Processor 102 may locate a position with better wireless communication quality than a current position of wireless communication device and further prompting movement to a direction to the desired position.

Block 404 may further refer to processor 102 deactivating the physical force when at least one of the following conditions is met. The physical force may be deactivated when the wireless communication quality improves to a level that is equal to or exceeds the predefined quality threshold, when no user response is detected for at least a given amount of time after moving the wireless communication device to the prompted direction, when the wireless communication device is not held by the user, or when the user initiates a halt of a component (e.g., the user access a user interface to initiate a halt or similar command, etc.) of the wireless communication device that generates the physical force.

Block 404 may further refer to processor 102 determining a posture of the wireless communication device and initializing the torque generation device with information representing the posture collected from accelerometer device 108. Processor 102 may retrieve an accelerometer signal indicating a posture of the wireless communication device. Torque generation device 106 may be configured to record the accelerometer signal indicating the posture of the wireless communication device as the initial posture thereof. Further torque and other forces may be generated according to calculations based on the initial posture Processing may continue from block 404 to 408.

Block 406 (Is Channel Stronger?) may refer to processor 102 determining whether the wireless communication channel quality improves when wireless communication device is moved to the prompted direction. Such determining may at least partially be based on the information received by processor 102 including a BER value and/or a SNR value. If the wireless communication channel quality is not stronger than before wireless communication device is moved, processing may continue from block 404 to 408. If the wireless communication quality improves, processing may continue from block 406 to 408.

Block 408 (Reduce Physical Force) may refer to processor 102 requesting torque generation device 106 to reduce, e.g., an intensity of the physical movement (e.g., a vibration or a torque) after wireless communication device has moved (e.g., turned, rotated, raised, lowered, twisted, or otherwise positioned) in accordance with the physical movement generated by torque generation device 106. The physical force may be completely terminated if the wireless communication channel quality meets the predefined quality threshold or may be reduced to a weak level, if the wireless communication quality has been improved but has not reached the predefined quality threshold.

Other example configurations of processing flow 400 may include a method implemented on a wireless communication device, for which operations may include monitoring a channel to capture a first reading of channel quality of a wireless communication, and determining when the first reading of channel quality of the wireless communication signal is below a predefined quality threshold. When the first reading of channel quality of the wireless communication signal is below the predefined quality threshold, operations for processing flow 400 may further include estimating a direction in which a second reading of channel quality for the wireless communication is estimated to be stronger than the first reading and activating a physical force in the wireless communication device in the determined direction, and deactivating the physical force after activating the physical force.

Thus, FIG. 4A shows an example configuration of a processing flow 400 of operations for which embodiments of generating physical responses may be implemented.

Figure 4B:
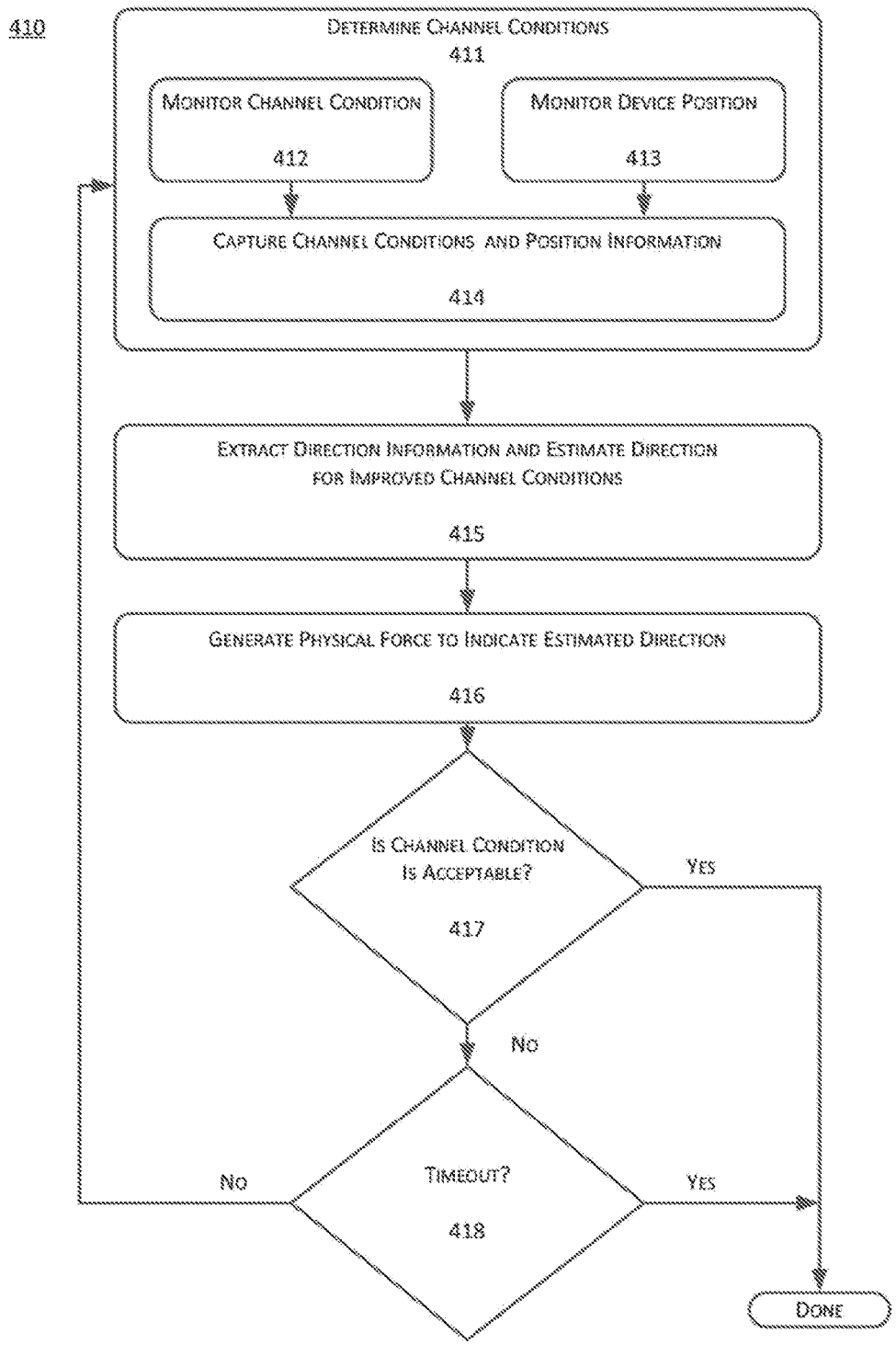
FIG. 4B shows another example configuration of a processing flow of operations by which embodiments of prompting movement of a device towards a stronger signal may be implemented.

FIG. 4B shows another example configuration of a processing flow 410 of operations by which embodiments of prompting movement of a device towards a stronger signal may be implemented. As depicted, processing flow 410 may include sub-processes executed by various components that are part of example device 100. However, processing flow 410 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 410 may include various operation, functions, or actions as illustrated by one or more of blocks 411, 412, 413, 414, 415, 416, 417, and/or 418. Processing may begin at block 411.

Block 411 (Determine Channel Conditions) may refer to processor 102 monitoring a channel to capture a first reading of channel quality for a wireless communication signal and further determining that the first reading of channel quality is below a predefined quality threshold. Block 411 may include block 412 (Monitor Channel Condition), block 413 (Monitor Device Position), and block 414 (Capture Channel Condition and Position Information).

Block 412 (Monitor Channel Condition) may refer to processor 102 monitoring a channel to capture the first reading of channel quality of the wireless communication signal. The first reading of channel quality may include a BER value and/or a SNR value.

Block 413 (Monitor Device Position) may refer to accelerometer device 108 capturing a 3D posture of the wireless device and position-information device 110 providing spatial information related to the wireless communication device during the communication.

Block 414 (Capture Channel Condition and Position Information) may refer to processor 102 capturing the first reading of channel quality and receiving the 3D posture and spatial information from accelerometer device 108 and position-information device 110. Processing may continue from block 411 to block 415.

Block 415 (Extract Direction Information and Estimate Direction for Improved Channel Conditions) may refer to processor 102 extracting direction information from position-information device 110, and utilizing the direction information to estimate a position or orientation of the wireless communication device with stronger wireless communication channel quality. The position or orientation may further indicate a direction in which the wireless communication device should be moved (e.g., turned, rotated, raised, lowered, twisted, or otherwise positioned) to improve the wireless communication channel quality. Processing may continue from block 415 to block 416.

Block 416 (Generate Physical Force to Indicate Estimated Direction) may refer to torque generation device 106 selectively generating a torque or a vibration that indicates the estimated direction in which the wireless communication device may be moved to improve the wireless communication quality. Processing may continue from block 416 to block 417.

Decision block 417 (Is Channel Condition Acceptable?) may refer to processor 102 determining whether the wireless communication channel condition improves to an acceptable level, e.g., the predefined quality threshold, when wireless communication device is moved to the prompted direction. Such determining may at least partially be based on the captured reading of channel quality when processor 102 monitors the channel of the wireless communication. If the channel condition reaches such an acceptable level, processing may end. If the channel condition is still below the acceptable level, processing may continue to block 418.

Decision block 418 (Timeout?) may refer to processor 102 determining whether a user fails to respond to the physical force, e.g., a torque or a vibration, for a predetermined amount of time (e.g., a predetermined or predefined duration) while the channel condition is still below the acceptable level. If the user fails to respond to the physical force for the predetermined amount of time, the processing may end. If the user responds to the physical force and the channel condition is still below the acceptable level, the processing may revert to block 411.

Figure 5:
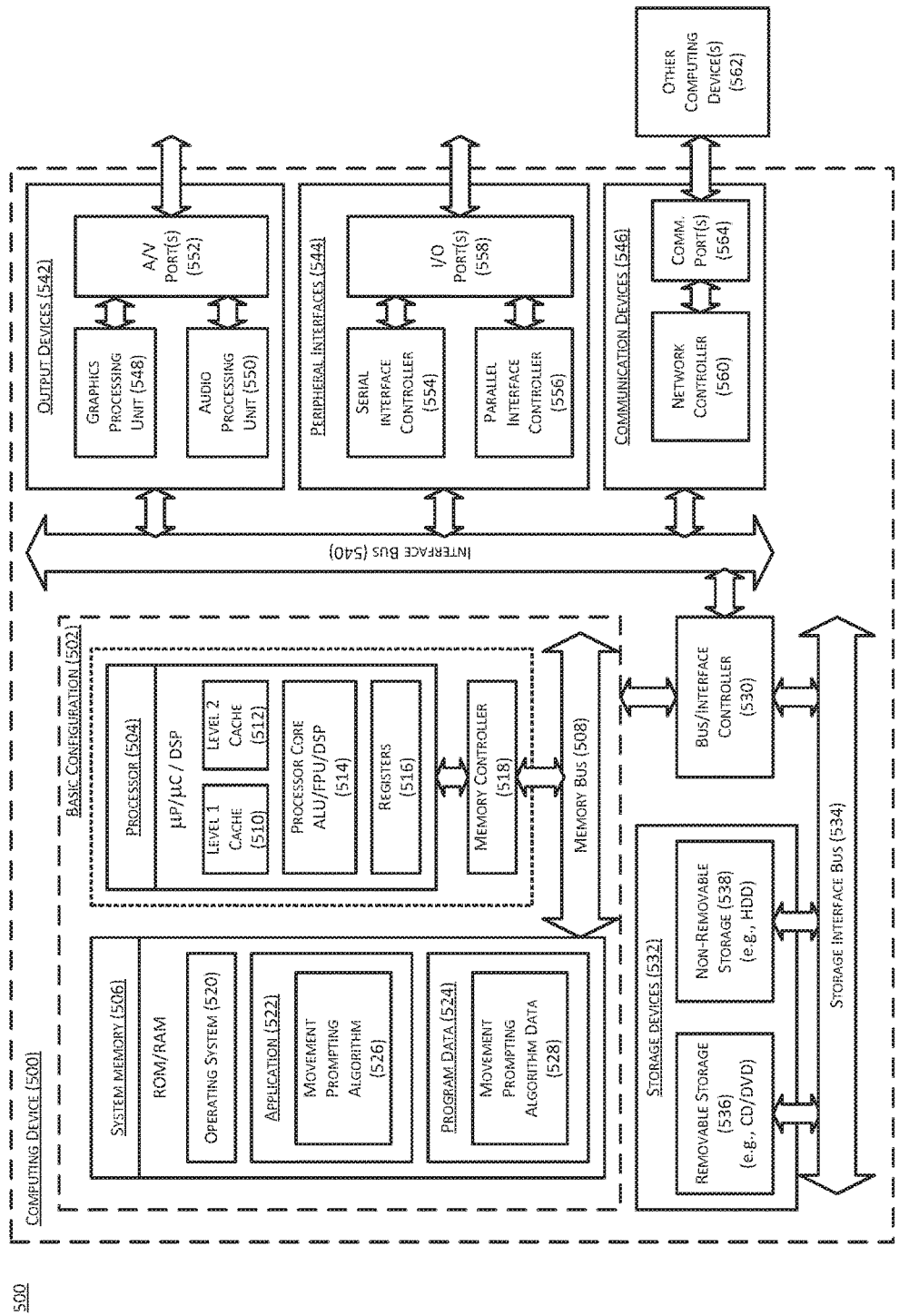
FIG. 5 shows a block diagram illustrating an example computing device that is arranged for prompting movement of a device towards a stronger signal.

FIG. 4B shows another example configuration of a processing flow 410 of operations by which embodiments of prompting movement of a device towards a stronger signal may be implemented FIG. 5 is a block diagram illustrating an example computing device 500 that is arranged for prompting a device towards a stronger signal in accordance with the present disclosure. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a movement prompting algorithm 526 that is arranged to perform the functions as described herein including those described with respect to the processing flow 400 of FIG. 4. Program data 524 may include movement prompting algorithm data 528 that may be useful for configuring movement prompting algorithm as is described herein. In some embodiments, application 522 may be arranged to operate with program data 524 on operating system 520 such that implementations of movement prompting may be provided as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

We claim:

1. A method implemented on a wireless communication device, the method comprising:
    monitoring, by the wireless communication device, a channel to capture a first reading of channel quality of a wireless communication signal;
    determining, by the wireless communication device, that the first reading of channel quality of the wireless communication signal is below a quality threshold; and
    in response to the first reading of channel quality of the wireless communication signal being determined to be below the quality threshold:
        estimating, by the wireless communication device, a direction in which a second reading of channel quality of the wireless communication signal is estimated to be stronger than the first reading of channel quality;
        activating, by the wireless communication device, a physical force in the wireless communication device in the estimated direction using two or more torque generation devices in the wireless communication device that are independently operable to generate the physical force in the estimated direction; and
        deactivating, by the wireless communication device, the physical force after the activation of the physical force.

2. The method of claim 1, wherein the estimated direction indicates a direction in which the second reading of channel quality of the wireless communication signal at least meets the quality threshold.

3. The method of claim 1, wherein the determining comprises determining that a bit error rate (BER) of a wireless communication link associated with the wireless communication device is greater than a BER threshold.

4. The method of claim 1, wherein the determining comprises determining that a signal-to-noise ratio (SNR) of a wireless communication link associated with the wireless communication device is less than a SNR threshold.

5. The method of claim 1, further comprising:
    determining that the wireless communication device is held by a user, wherein activating the physical force includes:
    in response to the wireless communication device being determined to be held by the user, enabling the two or more torque generation devices in the wireless communication device to generate the physical force in response to the determination that the first reading of channel quality of the wireless communication signal is below the quality threshold.

6. The method of claim 1, wherein the deactivating comprises:
    disabling the physical force, in response to at least one of a plurality of termination conditions being met, wherein the plurality of termination conditions include:
        the first reading of channel quality of the wireless communication signal is determined to be above the quality threshold,
        no user response is detected for at least a particular duration with respect to movement of the wireless communication device,
        the wireless communication device is determined to not be held by a user, and
        the user initiates a halt of the two or more torque generation devices in the wireless communication device that generate the physical force.

7. The method of claim 1, further comprising:
    determining a posture of the wireless communication device; and
    initializing the two or more torque generation devices with information that represents the posture of the wireless communication device.

8. The method of claim 1, wherein the estimating comprises estimating a direction to move the wireless communication device based at least, in part, on a previous orientation of the wireless communication device, information related to a condition of the channel, or both.

9. The method of claim 1, wherein the estimated direction includes a first direction, the method further comprising:
    monitoring the channel to capture the second reading of channel quality of the wireless communication signal after the activation of the physical force; and
    in response to the second reading of channel quality of the wireless communication signal being below the quality threshold:
        estimating a second direction in which a third reading of channel quality of the wireless communication signal is estimated to be stronger than the second reading of channel quality; and
        generating another physical force or a different physical force.

10. The method of claim 1, further comprising:
    monitoring channel quality of the wireless communication signal during a first duration;
    monitoring spatial information related to a physical position of the wireless communication device during the first duration;
    recording the spatial information during the first duration;
    recording the channel quality of the wireless communication signal during the first duration; and
    associating the recorded spatial information and the recorded channel quality of the wireless communication signal,
    wherein the estimating the direction comprises:
        evaluating the channel quality of the wireless communication signal and the associated spatial information from the first duration; and
        estimating the direction in which the second reading of channel quality of the wireless communication signal is estimated to be stronger than the first reading of channel quality based at least, in part, on the evaluated channel quality of the wireless communication signal and the associated spatial information from the first duration.

11. A wireless communication device, comprising:
a processor configured to:

receive, at a first time, a parameter to indicate wireless communication quality with respect to the wireless communication device;

based on the received parameter, evaluate the wireless communication quality to determine that the wireless communication quality is below a quality threshold; and generate an activation signal in response to the wireless communication quality being determined to be below the quality threshold; and two or more torque generation devices coupled to the processor, wherein the two or more torque generation devices are independently operable to generate a torque in a first direction in response to the activation signal, wherein the generated torque indicates an estimated direction to move the wireless communication device to improve the wireless communication quality.

12. The wireless communication device of claim 11, wherein the two or more torque generation devices comprise gyro micro-electro-mechanical systems (MEMS).

13. The wireless communication device of claim 11, wherein the parameter comprises a bit error rate (BER) or a signal-to-noise ratio (SNR) of a wireless communication link associated with the wireless communication device.

14. The wireless communication device of claim 11, wherein the processor is further configured to:

receive information related to a previous orientation of the wireless communication device or a condition of a wireless communication channel used by the wireless communication device; and estimate a direction to move the wireless communication device based on at least the received information.

15. The wireless communication device of claim 11, wherein the processor is further configured to:

receive the parameter, at a second time after the first time;

determine that the wireless communication quality is below the quality threshold based on the parameter received at the second time; and in response to the wireless communication quality being below the quality threshold, generate the activation signal that activates the two or more torque generation devices to generate the torque in the first direction or in a second direction different from the first direction.

16. The wireless communication device of claim 11, wherein the processor is further configured to:

deactivate the two or more torque generation devices after a termination condition is met, wherein the termination condition comprises one or more of:

the wireless communication quality is determined to be above the quality threshold, no user response is detected for at least a particular duration with respect to movement of the wireless communication device, the wireless communication device is determined to not be held by a user, and the user initiates a halt of the two or more torque generation devices of the wireless communication device that generate the torque.

17. The wireless communication device of claim 11, further comprising:

a proximity sensor coupled to the processor, wherein the proximity sensor is configured to:

detect that the wireless communication device is held by a user; and generate a proximity signal to indicate the detection, wherein the processor is further configured to receive the proximity signal from the proximity sensor, evaluate the proximity signal, and generate the activation signal in response to the wireless communication quality being determined to be below the quality threshold based on the evaluated proximity signal.

18. The wireless communication device of claim 11, further comprising:

an accelerometer, coupled to the processor, wherein the accelerometer is configured to generate an accelerometer signal to indicate a posture of the wireless communication device, wherein the processor is further configured to initialize the two or more torque generation devices based on the accelerometer signal.

19. The wireless communication device of claim 11, further comprising:

a position-information device, coupled to the processor, wherein the position-information device is configured to provide spatial information related to operation of the wireless communication device over a first duration, wherein the processor is further configured to:

monitor the wireless communication quality during the first duration;

monitor the spatial information related to a physical position of the wireless communication device during the first duration;

record the spatial information over the first duration;

record the wireless communication quality over the first duration;

associate the recorded spatial information and the recorded wireless communication quality;

estimate a second direction to move the wireless communication device in response to the activation signal, for which the processor is configured to:

evaluate the wireless communication quality and associated spatial information from the first duration; and estimate the second direction to move the wireless communication device to improve the wireless communication quality base at least, in part, on the evaluated wireless communication quality and associated spatial information from the first duration; and generate the activation signal that activates the at least two torque generation devices to generate the torque in the second direction.

20. The wireless communication device of claim 19, wherein the position-information device comprises a gyroscope or a global positioning system (GPS) device.

21. A wireless communication device, comprising:

a proximity sensor configured to:

detect that the wireless communication device is held by a user, and generate a proximity signal to indicate that the wireless communication device has been detected to be held by the user;

an accelerometer configured to generate an accelerometer signal to indicate a posture of the wireless communication device;

at least two torque generation devices which are independently operated so as to receive an activation signal and to generate a torque in a first direction in response to the activation signal;

a processor coupled to the proximity sensor, the accelerometer, and the at least two torque generation devices, wherein the processor is configured to:

receive a parameter to indicate wireless communication quality with respect to the wireless communication device;

based on the parameter, determine that the wireless communication quality is below a quality threshold; and in response to the wireless communication quality being determined to be below the quality threshold, generate the activation signal based on the accelerometer signal and the proximity signal.

22. The wireless communication device of claim 21, wherein the at least two torque generation devices comprise gyro micro-electro-mechanical systems (MEMS).

23. The wireless communication device of claim 21, wherein the parameter comprises a bit error rate (BER) or a signal-to-noise ratio (SNR) of a wireless communication link associated with the wireless communication device.

24. The wireless communication device of claim 21, wherein the processor is further configured to:

receive information related to a previous orientation of the wireless communication device or a condition of a wireless communication channel used by the wireless communication device; and estimate a direction to move the wireless communication device based at least, in part, on the received information.

25. The wireless communication device of claim 21, wherein the processor is further configured to:

receive an update of the parameter;

determine that the wireless communication quality is below the quality threshold based on the received update of the parameter; and in response to the wireless communication quality being below the quality threshold, generate the activation signal that activates the at least two torque generation devices to generate the torque in the first direction or in a second direction different from the first direction.

26. The wireless communication device of claim 21, wherein the processor is further configured to:

deactivate the at least two torque generation devices after at least one of a plurality of termination conditions is met, wherein the at least one of the plurality of termination conditions include:

the wireless communication quality is determined to be above the quality threshold, no user response is detected for at least a particular duration with respect to movement of the wireless communication device, the wireless communication device is determined to not be held by a user, and the user initiates a halt of the at least two torque generation devices of the wireless communication device that generate the torque.

27. The wireless communication device of claim 21, wherein the processor is further configured to initialize the at least two torque generation devices based on the accelerometer signal.

28. The wireless communication device of claim 21, further comprising:

a position-information device, coupled to the processor, wherein the position-information device is configured to provide spatial information related to the wireless communication device over a first duration, wherein the processor is further configured to:

capture the wireless communication quality over the first duration;

associate the spatial information with the captured wireless communication quality to provided associated information;

determine, at least in part on the associated spatial information, a second direction to move the wireless communication device to improve the wireless communication quality; and generate the activation signal that activates the at least two torque generation devices to generate the torque in the second direction.

29. The wireless communication device of claim 28, wherein the position-information device comprises a gyroscope or a global positioning system (GPS) device.

30. The wireless communication device of claim 24, wherein the processor configured to estimate the direction to move the wireless communication device is further configured to determine to turn, rotate, raise, lower, or twist the wireless communication device.

* * * * *

UNITED STATES PATENT AND TRADEMARK OFFICE
CERTIFICATE OF CORRECTION

| | | |
|---|---|---|
| PATENT NO. | : 9,858,775 B2 | Page 1 of 1 |
| APPLICATION NO. | : 14/907401 | |
| DATED | : January 2, 2018 | |
| INVENTOR(S) | : Yin et al. | |

It is certified that error appears in the above-identified patent and that said Letters Patent is hereby corrected as shown below:

In the Specification

In Column 4, Line 63, delete "attached by a clip)," and insert -- attached (e.g., by a clip), --, therefor.

Signed and Sealed this
First Day of May, 2018

Andrei Iancu
*Director of the United States Patent and Trademark Office*